United States Patent Office 3,346,329
Patented Oct. 10, 1967

3,346,329
PROCESS FOR RECOVERING VANADIUM VALUES FROM FERROPHOSPHORUS
John A. Hermann, Oklahoma City, Okla., assignor to Kerr-McGee Corporation, a corporation of Delaware
No Drawing. Filed Aug. 26, 1963, Ser. No. 304,616
11 Claims. (Cl. 23—15)

This invention broadly relates to the recovery of vanadium values from vanadium bearing materials. In one of its more specific aspects, the invention further relates to an improved process which is especially useful in the recovery of a high purity vanadium product from vanadium bearing aqueous solutions containing relatively large amounts of deleterious impurities such as phosphorus values.

A number of vanadium bearing ores and source materials are known to the art. For instance ferrophosphorus usually contains extraneous metal values such as vanadium, chromium, titanium, nickel and manganese. For instance, an average analysis for one ferrophosphorus of commerce is 27.5% phosphorus, 7.07% vanadium, 4.67% chromium, 1.23% titanium, 1.36% nickel, 0.2% manganese, 0.4% silicon and the remainder iron. Ferrophosphorus is available in large quantities at low cost, and it would be a convenient source material for relatively expensive vanadium provided an economic process for obtaining the vanadium in high purity were available.

Ferrophosphorus is a reduced product and it is necessary to subject it to an oxidizing roast in order to oxidize the vanadium values to a water-soluble state. As is well known, large quantities of contaminating substances such as phosphorus are rendered soluble by conventional roasting procedures in instances where the roast is sufficiently vigorous to result in the solubilization of vanadium values and the contaminants appear in the leach solution and in turn in the vanadium product precipitated therefrom. Phosphorus is an extremely deleterious contaminant and a vanadium concentrate is rendered useless as a commercial vanadium product in instances where the phosphorus exceeds more than very small amounts. It is therefore obvious that the control of phosphorus solubilization during the roast is very important.

In accordance with the prior art processes, ferrophosphorus was roasted for a sufficient period of time to solubilize the vanadium with an alkaline alkali salt such as sodium carbonate or sodium hydroxide as an essential constituent of the roast. Under these conditions the solubilization of the vanadium also resulted in the solubilization of other substances present in the ferrophosphorus, such as large amounts of phosphorus and chromium, and it was difficult to recover the vanadium values in sufficient purity for sale as a high purity commercial product. In instances where a neutral alkali metal salt was attempted to be used in the roasting of ferrophosphorus such as sodium chloride, the vanadium was not sufficiently solubilized to enable the vanadium values to be recovered in economic yields, and the vanadium was largely retained in the ferrophosphorus upon leaching the roast.

In accordance with the process to be described herein, it is possible to roast ferrophosphorus and oxidize the vanadium values to a soluble state while controlling the solubilization of phosphorus at a practical level. As a result, the roast may be leached with an aqueous leaching medium to thereby provide a vanadium bearing leach liquor which contains a sufficiently high ratio of vanadium values to phosphorus values to allow the recovery of a vanadium product of commerce of high purity when practicing the improved process of the invention. The process to be described hereinafter also includes improvements in cooling the ferrophosphorus during the roast to control the roasting temperature, and for quenching the roast so as to assure faster percolation leaching than was practical heretofore.

As is well known, the ratio of vanadium and phosphorus values in a leach liquor when calculated as $V_2O_5$ and $P_2O_5$ respectively must as a general rule exceed 15:1 to 20:1, or even 30:1, in order to meet commercial specifications for the final vanadium oxide product when following prior art precipitation procedures. Aqueous leach liquors derived from ferrophosphorus contain relatively large quantities of phosphorus values along with the desired vanadium values. Often, the ratio of vanadium values calculated as $V_2O_5$ to phosphorus values calculated as $P_2O_5$ is only 2:1 to 3:1, and it has been impossible heretofore to prepare a high grade vanadium oxide product therefrom which contains less than 0.05% phosphorus. Thus, a practical process for obtaining a specification grade vanadium product from highly contaminated leach liquors or other source materials has not been available prior to the present invention although the great need for such a process has long existed. Other sources of vanadium bearing liquors containing large amounts of phosphorus values exist and are well known to the art, and the invention is likewise useful in the recovery of a high purity vanadium product of commerce from such liquors.

It is an object of the present invention to provide an improved process for the recovery of vanadium values from vanadium bearing materials.

It is a further object to provide an improved process for recovering vanadium values from reduced vanadium bearing materials which must be subjected to an oxidizing roast prior to leaching to produce an aqueous solution containing vanadium values.

It is still a further object to provide an improved process for recovering vanadium values from ferrophosphorus.

It is still a further object of the invention to provide an improved process for recovering vanadium values in the form of a high purity commercial product from highly contaminated aqueous solutions in the presence of large amounts of phosphorus values.

Still other objects and advantages of the invention will be apparent to those skilled in the art upon reference to the following detailed description and the examples.

The invention will be described and illustrated hereinafter with specific reference to the recovery of a high purity vanadium oxide product of commerce from ferrophosphorus by a process including oxidatively roasting the ferrophosphorus to solubilize the vanadium values, leaching the roasted ferrophosphorus to thereby produce an aqueous leach liquor containing vanadium values, and thereafter recovering the vanadium values from the leach liquor by precipitation and purification in accordance with the invention. However, it will be recognized by those skilled in the art that the invention is not limited thereto. Other aqueous media containing vanadium values may be used in practicing the invention and especially liquors which contain large amounts of phosphorus and other contaminants. Also, other vanadium bearing ores and source materials may be used.

It has been discovered that if a vanadium bearing ore such as ferrophosphorus is roasted under oxidizing conditions over a plurality of roasting stages in the presence of a substantially neutral alkali metal salt, the vanadium values are solubilized and may be recovered in high yield and the solubilization of phosphorus and other undesirable impurities is controlled within practical limits.

The ferrophosphorus or other ore as received usually is in the form of lumps of substantial size and it should be ground to a fine particle size prior to roasting. Usually, it is preferred that the ferrophosphorus be ground to −80 to −400 mesh and for better results about −100 to −150 mesh. One preferred method is to reduce the ore to the ultimate particle size by means of a hammer mill.

The alkali metal salt is to be roasted with the ferrophosphorus may be added to the ore at a suitable stage. Preferably, the salt as about −30 mesh material is added to the ore following reduction to the ultimate particle size such as −100 mesh.

The mixture of ore and alkali metal salt may be subjected to an oxidizing primary roast at a temperature sufficiently low to prevent melting of the ferrophosphorus or a large amount of sintering. For best results, the primary roast is conducted in the presence of an oxidizing elemental oxygen-containing gas such as air at a temperature of approximately 650–750° C. The roast may be conducted over a period of approximately 1 to 4 hours, although longer or shorter times may be effective in some instances depending upon the nature of the ore such as from 30 minutes to 8 hours. Thereafter, the hot primary roast may be cooled to a temperature sufficiently low for the ore to be crushed as it agglomerates to some extent during the roast. The cooling or quenching step may be accomplished by allowing the hot roast to cool in air at ambient temperature, air or steam may be passed over the hot roast, or it may be sprayed with sufficient water to allow cooling without actually immersing in water. The hot roast may be quenched by submersing in water but this is not usually desired.

The cooled ore may be crushed or ground to a particle size not greater than about −3 mesh and preferably not greater than −10 mesh, or to a smaller particle size such as about −80 to −400 mesh. Also, an additional quantity of the alkali metal salt may be added and mixed with the ore, and preferably prior to crushing so that the salt is intimately mixed throughout the ore and ground therewith to provide a fine particle size. For best results, the ore should be at a temperature not greater than about 100–200° C. during the crushing step following the primary roast. In some instances, all of the alkali metal salt may be added prior to the primary roast and a further addition prior to the secondary roast is not necessary.

The ferrophosphorus ore from the primary roast, and in the presence of the alkali metal salt, may be subjected to a secondary roast under oxidizing conditions at a temperature of approximately 600–800° C. The secondary roast may be conducted in the presence of an elemental oxygen-containing gas such as air over a period of approximately 1 to 4 hours, but longer or shorter periods may be satisfactory such as about 30 minutes to 8 hours. The ore may be air or steam cooled following the secondary roast, or it may be quenched by means of a water spray wherein water is sprayed on the ore in sufficient quantities to reduce its temperature without immersing the roasted ore in a pool of water. The hot roasted ore may be quenched by immersing in water so as to fracture the agglomerates but this is not necessary and usually is not preferred when a percolation leaching step is used for leaching the vanadium values from the roasted ore.

In instances where the ore is to be percolation leached, the hot secondary roast is air or steam cooled, or sprayed with a controlled amount of water which is preferably insufficient to permanently wet the ore to thereby reduce the temperature to a value not greater than about 100–200° C. Thereafter, the cooled roasted ore is percolation leached with water to thereby produce a leach solution containing the solubilized vanadium values and greatly reduced amounts of phosphorus and other undesirable impurities.

Prior art agitation leaching with water may be used when this is desirable for recovering the solubilized vanadium from the roast, and only about one to two hours of agitation leaching is necessary in most instances. The leach liquor from an agitation leach usually is not as clear as that obtained with percolation leaching and clarification may be necessary in some instances.

In instances where a percolation leach is practiced, it is preferably conducted in a plurality of leach vessels with the aqueous leach liquor advancing over at least three-four stages to thereby produce a very concentrated leach liquor. Usually only one-two tons or less of water per ton of roasted ore is necessary for leaching and there is no need for clarifiers or thickeners.

When the preferred quench procedure of the invention is used in combination with percolation leaching, it is possible to obtain flow rates of 100–200 gallons per square foot per day or higher. Usually, the flow of leach liquor through the ore in the preferred percolation leach process is restricted to provide a total residence time upon advancing through four leach cycles or stages of approximately one day and thereby assure extraction of almost the entire solubilized vanadium content of the ore. It is preferred that a submerged leach be conducted, although a trickle leach of the ore is possible. The particle size of the roast averages about one-half inch in diameter when the preferred quenching process is effected, and the agglomerates are porous and cellular. As a result, particle size is not important and much larger particles than one-half inch may be leached when this is desirable, or smaller particles down to the point where they become sufficiently small to restrict the flow of the leach liquor.

The amount of alkali metal salt which is added to the ore may be varied over wide ranges. In most instances and especially when the ore is ferrophosphorus it is preferred that the total amount of alkali metal salt which is added be approximately 0.35 to 2 parts by weight for each part by weight of ore. For best results, it is usually preferred that all of the salt be added prior to the primary roast, but if desired the alkali metal salt may also be added in two stages with about 5–95% of the salt being added prior to the primary roast and approximately 95–5% being added prior to the secondary roast. When the ferrophosphorus contains about 7% vanadium, then a total of about 0.7 part by weight of the alkali metal salt per part by weight of ferrophosphorus is used for best results although this may vary somewhat when the vanadium content of the ferrophosphorus varies. For instance, when sodium chloride is used as the alkali metal salt it is preferred that the weight ratio of sodium chloride to the vanadium content vary between 5:1 and 20:1, and preferably is about 10:1.

The nature of the alkali metal salt which may be used in practicing the present invention is of importance. For instance, for best results an amount effective to solubilize phosphorus of alkaline alkali metal salts such as the alkali metal carbonates, hydroxides etc. should not be used, and only substantially neutral alkali metal salts are satisfactory. The preferred alkali metals are sodium and potassium, and the salts are usually substantially neutral salts of strong mineral acids such as sulfates, halides including chlorides, etc. Sodium chloride is much preferred.

It is very desirable that the ore be reduced to a fine particle size in instances where a maximum recovery of the vanadium is desired. Usually, for a commercial process it is preferred that the particle size be not greater than −80 mesh and preferably not greater than −100 mesh at the time of first subjecting the ore to the primary roast. Also, for best results the added alkali metal salt should be intimately and uniformly mixed with the finely divided ore. It is very desirable that the agglomerated ore from the primary roast be subjected to a crushing or grinding step prior to the secondary roast to assure that the interior of the agglomerates is subjected to an oxidizing roast in the presence of an additional quantity of the alkali metal salt. Otherwise, maximum recovery of vanadium is not obtained in most instances.

Ferrophosphorus is a reduced product and it is essential that it be subjected to an oxidizing roast. In most instances, air is passed over the ore during the roast in quantities sufficient to assure an oxidizing atmosphere.

This also has the desirable effect of cooling the highly exothermic reactants and air at ambient temperature may be supplied in a volume sufficient to assure that the desired temperature range is maintained. In such instances, a much larger quantity of air is supplied than is normally necessary to assure an oxidizing atmosphere.

The use of air in excess for cooling purposes may be undesirable in instances where the alkali metal salt is a chloride and it is desired to recover a maximum amount of gaseous hydrochloric acid from the roaster gases. It has been discovered that excess elemental oxygen and low moisture content in the roaster gases reduce the hydrochloric acid content and thus are detrimental to the percent yield of hydrochloric acid. In one important variant of the invention water may be sprayed or added by other suitable method to the roasting ore or supplied to the roaster atmosphere in the form of water vapor or steam during at least a portion of the roasting cycle. The added water cools the ore and thereby aids in maintaining the desired temperature range and this is especially desirable during the highly exothermic stages of the roast. The added water also reduces the free chlorine content and assures a maximum content of hydrochloric acid in the roaster gases and the yield of gaseous hydrochloric acid may be increased substantially. Additionally, less cooling air is needed to maintain the desired temperature range and the volume of gases withdrawn from the roasters is much less and may be much more easily scrubbed for recovery of gaseous hydrochloric acid and other constituents such as vanadium values. The water may be added in the form of liquid or steam at the rate of about 0.1–2 pounds per pound of ore and preferably 0.5–1.5 pounds per pound of ore.

In still another important variant of the invention, magnesium oxide and/or calcium oxide, or magnesium or calcium salts which are capable of yielding these substances in the roaster, may be added to the ore at some stage prior to a roasting step to further reduce the amount of phosphorus in the leach liquor. Only a small amount of these substances should be added, such as up to 0.1 lb./ton of magnesium oxide or its equivalent, or up to 0.04 lb./ton of calcium oxide, or its equivalent. It is preferred that the magnesium oxide or calcium oxide be added prior to the second roast in most instances, although it may have some beneficial effect when added prior to the first roast. In some instances, better results may be obtained by adding small amounts to both the primary and secondary roasts.

The time periods for the primary and secondary roasts may vary over wide ranges. However, it is preferred that the primary roast be conducted for such a period of time as is required to assure a pH value of 5.5 or higher upon quenching or leaching a portion of the crushed roasted ore in water. Normally, the primary roast is yellow to brownish yellow in color at this stage, and the pH value of the quench or leach water will be greater than 5.5 with no ferrous iron or substantially no ferrous iron being present in the roast. Preferably, the pH value is at least 6.0, and for best results about 6.6 to 6.9 or higher. In carrying out this test, it is necessary that the ferrophosphorus from the primary roast be sufficiently finely divided to assure that the quenching or leaching water reaches the interior of the particles as otherwise a true test is not obtained. The secondary roast should be conducted for such a period of time as is necessary to provide a pH of seven or higher in a small amount of water used to quench or leach a portion of the crushed roasted ore, and preferably the pH is 7.5 to 8.0 or higher. When the primary and secondary roasts are conducted as described above, then a maximum amount of the vanadium is solubilized and a minimum amount of undesirable impurities such as phosphorus.

In some instances, it is desirable to conduct at least a portion of the roast under conditions where added water is not present in the roaster gases in contact with the ore. This seems to aid in the solubilization of a maximum amount of vanadium.

The roaster gases emerging from the primary and secondary roasters may be scrubbed with an ammoniacal solution for the purpose of recovering the hydrochloric acid content and thereby producing a concentrated solution of ammonium chloride, which is employed in a subsequent step in the process for the recovery of vanadium values from the leach liquor. The gases may be scrubbed in several stages by cooling and dissolving the hydrochloric acid in a water-ammonium chloride solution which has been neutralized with ammonia for conversion of the absorbed hydrochloric acid to ammonium chloride, which is recirculated until it is built up to the desired strength such as 250–300 g./l. When water is sprayed on the roasting ore during the highly exothermic portion of the roast, the effluent gases from the roaster have a higher total hydrochloric acid content and thus the over-all yield of hydrochloric acid is increased and in turn the yield of ammonium chloride. This is of great importance as a large excess of ammonium chloride must be present in the precipitating liquor in order to recover the vanadium values in acceptable yield. Since the roaster gases may be the sole source of hydrochloric acid for the process, increasing the yield of hydrochloric acid benefits the entire process.

Leaching the cooled roasted ore with the smallest possible volume of water produces a slightly alkaline sodium vanadate solution containing about 50 grams of $V_2O_5$ per liter. The solution is contaminated with chromium and phosphate in amounts whereby ordinary red cake precipitation is not useful due to the low $V_2O_5$ to $P_2O_5$ ratios. Normally, the $V_2O_5$ to $P_2O_5$ ratio is not higher than about 10:1, and never higher than 15:1, and often as low as 2–3:1. Thus, prior art precipitation processes are useless when operating on such highly contaminated liquors and it is necessary to employ the improved process of the invention in order to obtain acceptable results when using a precipitation technique.

In order to obtain massive phosphate and chromium rejection while precipitating the vanadium values, the latter is converted to relatively insoluble ammonium metavanadate by treating the sodium vanadate leach liquor with excess ammonium chloride. The bulk of the phosphate and chromium remain in solution in the mother liquor and a slightly contaminated ammonium vanadate is precipitated therefrom.

It has been discovered that the high phosphate content of the leach liquor has a deleterious influence on the completeness of the ammonium metavanadate precipitation and to overcome this and obtain acceptable recoveries, a significant excess of ammonium chloride is added. It is desirable to have the vanadium-containing liquor as concentrated in vanadium values as possible, such as 40–60 g./l. of $V_2O_5$, or higher, and to provide an excess of at least 25 g./l. of ammonium chloride in the solution. Good results are obtained with 25–150 g./l. of excess ammonium chloride and preferably 75–125 g./l.

The crude ammonium metavanadate may be filtered from the mother liquor, washed with a small amount of cold ammonium chloride solution and finally with a small amount of water. This product usually contains excessive contaminants such as phosphate and chromium and must be further purified in order to meet commercial specifications. The purification of the crude ammonium metavanadate may be accomplished in any of a number of methods, as follows:

(1)

Step A.—Redissove the crude ammonium metavanadate in hot water and filter to remove insoluble impurities.

Step B.—Add excess ammonium chloride to the filtered solution to precipitate the vanadium as ammonium metavanadate. Sufficient ammonium chloride is added to exert its common ion effect and the hot solution is cooled to complete the precipitation.

*Step C.*—Filter the precipitated ammonium metavanadate, wash with a small amount of ammonium chloride, and then water, and dry to produce purified ammonium metavanadate.

*Step. D.*—If desired, thermally decompose the ammonium metavanadate to high grade $V_2O_5$ and gaseous ammonia. The $V_2O_5$ may be fused to produce black cake of commerce.

(2)

*Step A.*—The crude ammonium metavanadate is suspended and pulped in excess mineral acid such as sulfuric acid or hydrochloric acid to convert it to red cake or equivalent. However, in most instances the crude ammonium metavanadate from highly contaminated liquors does not meet commercial specifications unless further upgraded and it is usually preferred that the crude ammonium metavanadate be first purified.

(3)

*Step A.*—Redissolve the crude ammonium metavanadate in warm to hot water containing a stoichiometric equivalent of sodium carbonate, sodium hydroxide, or both. The amount of water is maintained at a minimum to thereby provide a highly concentrated solution of sodium vanadate which is then filtered.

*Step B.*—Excess ammonium chloride is added to the filtered solution of vanadian values to metathesize the sodium vanadate to ammonium metavanadate, which is precipitated. A large excess of ammonium chloride is added for best results.

*Step C.*—If desired, the purified ammonium metavanadate produced by Step B above may be decomposed to high grade $V_2O_5$ by heating which in turn may be fused to produce black cake of commerce.

*Step D.*—When desired, it is possible to take the highly concentrated solution of sodium vanadate produced by Step A above, and carry out a low pH hydrated $V_2O_5$ precipitation step or red cake precipitation step by addition of sulfuric or hydrochloric acid.

(4)

*Step A.*—The crude ammonium metavanadate precipitate is partially redissolved in less than a stoichiometric amount of aqueous sodium carbonate, sodium hydroxide, or both. The crude ammonium metavanadate is heated and digested for a period of time, and the solution is not filtered.

*Step B.*—Excess ammonium chloride is added to the suspension produced in Step A, to thereby metathesize the small amount of sodium vanadate which is produced to ammonium metavanadate and precipitate the same. Excess ammonium chloride is added to achieve a maximum recovery of ammonium metavanadate. This results in an ammonium metavanadate of high purity.

*Step C.*—The suspension from Step A may be suspended and pulped in excess hydrochloric or sulfuric acid to convert to red cake or hydrated $V_2O_5$ when purity of the ultimate product is not a problem.

*Step D.*—The ammonium metavanadate product of Step B may be decomposed at elevated temperature, and this product, as well as the product of Step C may be fused to produce black cake of commerce.

In view of the above, it is apparent that the crude ammonium metavanadate may be purified by one of several processes, one process includes a digestion step with a small amount of aqueous alkali wherein only a portion is actually dissolved, such as ¼–¾ and preferably ½, and the pulp is not filtered. Thereafter, the dissolved ammonium metavanadate is reprecipitated by addition of a water soluble ammonium salt in excess. The second process includes adding sufficient alkali in the solution to dissolve all of the ammonium metavanadate and produce a solution as concentrated as 250–400 or more grams of $V_2O_5$ per liter. This is filtered from traces of impurities and is then reprecipitated with a water soluble ammonium salt as ammonium metavanadate. It is desirable in the above processes that high concentrations of ammonium metavanadate be achieved as otherwise significant losses of product result due to the residual solubility of ammonium metavanadate in the mother liquor. Higher concentrations of vanadium may be achieved by the presence of the alkali, rather than dissolving the ammonium metavanadate in water.

It is desirable to recover the ammonia content of the mother liquor from each of the ammonium metavanadate precipitation steps. This may be conveniently accomplished by adding a stronger base such as sodium carbonate, sodium hydroxide, potassium hydroxide, potassium carbonate, calcium oxide, magnesium oxide, etc. to the mother liquor, followed by heating and collection of the gaseous ammonia. The ammonia is then passed to the scrubbers for removing hydrochloric acid from the roaster gases, where it is reacted to produce ammonium chloride for recycle in the process. Also, in instances where the crude ammonium metavanadate is purified by dissolving or partially dissolving in alkali or the ammonium metavanadate product is decomposed by heating, the resulting ammonia gas is likewise passed to the absorber and used to produce ammonium chloride for recycle in the process. It is also possible to pass mother liquor to the absorber from either of the ammonium metavanadate precipitation steps and recover the ammonium salt content.

After recovery of ammonia in the mother liquor from the first ammonium metavanadate precipitation, the resulting solution contains less than 0.5 g./l. of $V_2O_5$ and very substantial amounts of phosphate values. These may be recovered as a precipitate by addition of a calcium or magnesium salt thereto, such as calcium oxide, calcium hydroxide, magnesium oxide, magnesium hydroxide or other source of calcium or magnesium ion. The resultant precipitate, which is believed to be calcium acid phosphate or magnesium acid phosphate, is an article of commerce that may be recovered and sold. Preferably, a magnesium salt is added to thereby precipitate magnesium acid phosphate which is useful as a fertilizer.

In some instances, it is preferred that the crude ammonium metavanadate be purified by redissolving as completely as possible in water, dilute ammonium hydroxide (pH about 8.5), or in sufficient sodium carbonate or hydroxide to give substantially complete dissolution. The solution is filtered from any insoluble material and is maintained hot (60–70° C.) while an excess of ammonium chloride, either solid and/or in a concentrated aqueous solution, is added over a 1–3 hour period. The solution is then cooled slowly while the product crystallizes.

Mother liquor from the crude ammonium metavandate precipitation may be partly recycled to the hydrochloric acid scrubber for the roaster gases. Mother liquor from the ammonium metavanadate purification precipitation may be partially advanced to the crude ammonium metavanadate precipitation as a source of ammonium salt, with the remainder being passed to the scrubber for evaporation and increasing the ammonium chloride concentration.

The foregoing detailed description and the following specific examples are for purposes of illustration only and are not intended as being limiting to the spirit or scope of the appended claims.

*Example I*

A percolation leach liquor was taken having the following composition

| | G. per liter |
|---|---|
| $V_2O_5$ | 46.6 |
| $P_2O_5$ | 26.75 |
| Cr | 0.70 |
| Na | 40.3 |
| Cl | 18.0 |

One hundred ml. of the above liquor was heated at 70–75° C. and 49 ml. of a 30% by weight $NH_4Cl$ solution was slowly added. The mixture was stirred and allowed to cool for 4 hours to about 25° C. The excess $NH_4Cl$ over the amount required to precipitate the vanadium values as ammonium metavanadate amounted to about 80 g./liter and an additional quantity was added to bring it to 100 g./l. After another hour the pulp was filtered. The filtrate contained only 0.42 g. $V_2O_5$/liter. The crude ammonium metavanadate product contained 0.22% $P_2O_5$.

(a) To purify the crude ammonium metavanadate, about half of it was slurried in 35 ml. of water to which enough ammonia was added to bring the pH to about 8.5 and the mixture was heated to boiling. After a few minutes of digestion during which the ammonium metavanadate was incompletely dissolved, 15 ml. of 30% $NH_4Cl$ solution was added and the pulp was stirred, cooled and then filtered to yield ammonium metavanadate containing only .068% $P_2O_5$.

(b) A second portion of the crude ammonium metavanadate was suspended in about 75 ml. of water, heated to the boiling point and converted into a hydrated vanadium pertoxide by acidifying with sulfuric acid to a pH of about 1.1. The product so obtained contained 0.13% $P_2O_5$.

Example II

This example illustrates the partial dissolution and digestion of a crude ammonium metavanadate with soda ash for subsequent conversion to a purified product.

1.7 liters of a leach liquor as in Example I but containing 42 g. $V_2O_5$/liter was heated to 65–70° and to this was slowly added (over a period of about 2½ hours) 200 g. $NH_4Cl$ dissolved in a minimum of water. The mixture was stirred and cooled over 2–3 hours to about 25° C. to complete the precipitation. The product was filtered and washed with about 2.5% $NH_4Cl$ solution. The filtrate contained 0.62 g./l. $V_2O_5$ while the crude product contained 0.286% $P_2O_5$. The slow addition of ammonium chloride to the hot leach liquor aided in rejecting phosphate.

The wet crude ammonium metavanadate was stirred in 300 ml. of water, 30 g. of sodium carbonate was added and the mixture was heated to 80° C. and digested for approximately one hour. About 60% of the ammonium metavanadate dissolved as indicated by analysis of a portion of the pulp which was filtered. At this point, 30 g. of $NH_4Cl$ in 50 ml. water was added slowly at 80° and the mixture was stirred and cooled to room temperature. The reprecipitated ammonium metavanadate was collected and washed as in the preceding example to yield a product containing .076% $P_2O_5$.

If the initial ammonium metavanadate is precipitated rapidly at room temperature instead of slowly from a hot solution, it is more contaminated with phosphate but may still be effectively purified as illustrated in the next example. This also illustrates a feature of the process which is beneficial in making more complete the recovery of $V_2O_5$ from the mother liquor obtained in the final precipitation step; e.g. the recycling or advancing of the mother liquor to the precipitation of the crude ammonium metavanadate. Not only is more $V_2O_5$ recovered, but the ammonium chloride present in the mother liquor is utilized.

Example III

A liter of pregnant liquor containing 35.4 g. $V_2O_5$, 14.6 g. $P_2O_5$, 0.86 g. Cr, 39.3 g. Na, and 30.1 g. Cl was mixed with 0.31 liter of mother liquor obtained from a previous ammonium metavanadate reprecipitation (assay 0.7 g. $V_2O_5$ per liter). It was desired to precipitate the crude ammonium metavanadate from a solution containing an excess of about 150 g. $NH_4Cl$/liter to promote better ammonium metavanadate recovery. To this end, 217.4 g. of solid $NH_4Cl$ was added at room temperature to the stirred mixture over a 20 minute period and the product was filtered after an hour. The filtrate contained 0.34 g. $V_2O_5$, 100 g. NaCl, 0.47 g. Cr and about 10 g. $P_2O_5$ per liter. The crude product assayed 1.21% $P_2O_5$ and 0.4% Cr.

The crude product was treated with 100 ml. water and 14.5 g. NaOH (approximately one chemical equivalent based on $NH_4VO_3$). It was heated to dissolve, $NH_3$ was evolved, and the solution was clarified by filtration. Over a 30 minute period 25 g. $NH_4Cl$ (as a 25% solution) was added, the mixture was cooled, stirred and digested for an hour and then filtered and washed with 5% $NH_4Cl$ solution and a little water. The so prepared ammonium metavanadate contained .074% $P_2O_5$, .015% Na, and .025% Cr.

Example IV

This example illustrates the conversion of a crude ammonium metavanadate (with acid) to a hydrated $V_2O_5$ product. 445 ml. of a pregnant liquor (48.5 g. $V_2O_5$ and 18 g. $P_2O_5$ per liter) was heated to 70°, 44 g. solid $NH_4Cl$ was added slowly and the crude ammonium metavanadate product was collected as in the preceding example. It contained 0.15% $P_2O_5$.

A portion of the moist ammonium metavanadate was added to a quantity of 6 molar hydrochloric acid sufficient to give a pulp with a terminal pH of 0.7 after heating at 70° C. for thirty minutes. The hydrated "red cake" was collected, washed, and a portion fused. It contained 0.115% $P_2O_5$.

A second portion of the moist ammonium metavanadate was dissolved in dilute NaOH and clarified from some insoluble material by centrifuging. The clear solution was heated and acidified with sulfuric acid to pH about 1 to precipitate a "red cake" which after fusion contained 0.024% $P_2O_5$.

Example V

Two liters of a mother liquor (as in Example III) was mixed with 8.26 liters of a pregnant liquor of composition similar to that in Example I. At 50°–60° C., 1200 g. of solid $NH_4Cl$ was added over a four hour period, and the mixture was stirred and cooled to about 25° C. when the crude ammonium metavanadate was collected. The product was washed with four 300 ml. portions of 5% $NH_4Cl$. A portion of the product was dried, analyzed and found to contain by weight:

| | Percent |
|---|---|
| $V_2O_5$ | 74.22 |
| $NH_3$ | 15.16 |
| $P_2O_5$ | 0.11 |
| Cr | 0.43 |
| Cl | 2.19 |
| KOH insoluble | Nil |
| Fe | 0.03 |
| Na | 0.056 |
| As | <0.01 |
| Insol. | 0.23 |
| $SO_4$ | <0.02 |

The barren mother liquor contained 0.55 g. $V_2O_5$, 19.6 g. $P_2O_5$, 25 g. $NH_4^+$, 43.3 g. Na, 115 g. Cl, and 0.5 g. Cr per liter.

For purifying, the wet cake was suspended in 1600 ml. water, 160 g. $Na_2CO_3$ (less than stoichiometric) and 110 g. NaOH (less than stoichiometric) were added and the mixture heated. Ammonia was evolved and the ammonium metavanadate dissolved. The solution was filtered with a little "Filter Aid," reheated to 50°–60° C. and 1800 ml. of 25% $NH_4Cl$ added over 4 hours. After an additional several hours of cooling and stirring the pure ammonium metavanadate was filtered and washed with water until washings were colorless. A portion of the dried product had the following composition:

| | Percent |
|---|---|
| $V_2O_5$ | 77.42 |
| $NH_3$ | 15.3 |

|       | Percent |
|-------|---------|
| $P_2O_5$ | 0.03 |
| Cr    | 0.004 |
| Fe    | 0.028 |
| Na    | 0.04 |
| As    | <0.002 |
| Insol. | 0.03 |
| $SO_4$ | 0.02 |
| Cl    | <0.01 |

The bulk of the wet product was heated slowly up to 550° C. over about a 2 hour period to decompose it to $V_2O_5$, yielding 400 g. of product having the composition:

|       | Percent |
|-------|---------|
| $V_2O_5$ | 100.03 |
| $V_2O_4$ | 0.74 |
| N    | 0.03 |
| $P_2O_5$ | 0.011 |
| Cr   | 0.008 |
| KOH insol. | Nil |
| Ca   | 0.02 |
| Mg   | 0.008 |
| Al   | 0.006 |
| Fe   | 0.037 |
| Na   | 0.05 |
| As   | 0.002 |
| Insol. | 0.04 |
| $SO_4$ | 0.033 |

The mother liquor from the first precipitation was used for recovery of ammonia (see following example) while the mother liquor from the precipitation proceeds either to the HCl scrubbing or is advanced to combine with fresh leach liquor for crude ammonium metavanadate.

Example VI 1.27 liters of filtrate from a "crude" ammonium metavanadate precipitate (containing about 200 g. $NH_4Cl$ per liter) were heated and digested over a 2 hour period with a total of 100 g. quick-lime. The ammonia evolved is collected and used for neutralizing HCl collected in the scrubber system. The pulp obtained from this lime treatment was filtered and the filtrate analyzed to indicate the following composition:

|       | G./l. |
|-------|-------|
| $V_2O_5$ | 0.16 |
| $P_2O_5$ | 0.104 |
| Cr    | 0.49 |
| NaCl  | 67.5 |
| Cl    | 112.6 |
| $NH_4^+$ | 0.72 |

Thus the ammonia is substantially wholly recoverable.

Example VII

Five hundred milliliters of percolation leach liquor assaying 40 g. $V_2O_5$/liter is taken for precipitation. For metathesis 12 g. of $NH_4Cl$ is added either as solid or in concentrated solution. No precipitation occurs as a result of this addition. The solution is heated to 60°–70° C. and then over a period of 1–2 hours 50 cc. of ammonium chloride solution (250 g./liter) is added. The temperature at the end of the addition is about 50° C. and precipitation is well begun. The mixture is cooled further either by aerating or with cooling coils to bring the temperature to about 20° C. After stirring and digesting for about 2–3 hours, the crude ammonium metavanadate is filtered, washed with 50 ml. of ammonium chloride solution (25 g./l.) and about 5–10 ml. of cold water. The filtrate contains about 0.5 g. $V_2O_5$/liter and the product contains excess $P_2O_5$ (about 1%).

For further purification, the crude ammonium metavanadate is redissolved by heating at 90° C. with 400 ml. water and filtered through some diatomaceous earth. To the hot filtrate 100 ml. of 250 g./l. $NH_4Cl$ solution is added over a one hour period with stirring followed by cooling and crystallization for an additional several hours. The product is filtered and washed as described above. The $P_2O_5$ content is decreased to about 0.09%.

Example VIII

Ferrophosphorus containing 27.5% P, 7.07% V, 4.67% Cr, 1.23% Ti, 1.36% Ni, 0.2% Mn, 0.4% Si and the remainder Fe, by weight, and having a particle size of approximately 2 to 3 inches was fed to a gyratory where the particle size was reduced to about 1½ inches. The gyratory discharge was fed to a standard cone crusher which in turn discharged material to a vibrating screen fitted with a ¼-inch aperture screen. The screen oversize was fed to a Pennsylvania impactor where it was reduced to a size passing the screen, and the screen undersize, —¼-inch material, was used as ball mill feed. Further grinding was in a Hardinge airswept mill using a 270 M screen specification as a control. A screen analysis of the output indicated that the —270 M fraction was about 75% and the +150 M fraction was about 8%. Sodium chloride in an amount of 0.5 pound per pound of ferrophosphorus was mixed with the output from the Hardinge mill and the mixture passed to a rod mill where it was ground to —100 mesh.

The mixture of ground ore and salt was fed to a primary roaster and subjected to a primary oxidizing roast at a temperature of 650–725° C. until a sample of the roasted ore when crushed and immersed in a small amount of water resulted in a pH value of 6.5 in the water. This required a roast of about four hours. Then, the roasted ore was cooled from the roasting temperature to 100° C. by passing air at ambient temperature thereover. It was also found that a satisfactory and more rapid quench could be achieved by spraying droplets or a mist of water on the hot roasted ore in quantities sufficient to cool the ore without immersing it in a pool of water.

The cooled roasted ore from the primary roaster was ground to —100 mesh in a ball mill. Prior to feeding the roasted ore to the ball mill, 0.25 lb. of sodium chloride per pound of ferrophosphorus was added and the mixture fed to the ball mill for the purpose of assuring a desired particle size and thorough mixing of the salt with the roasted ore.

The output from the ball mill was fed to a secondary roaster and subjected to a secondary oxidizing roast at a temperature of 650–725° C. The secondary roast was continued for a period of time sufficient to result in a pH of 8 when a sample of the roast was crushed and quenched in a small amount of water. The secondary roast required about three hours. In both the primary and secondary roasts an oxidizing atmosphere was provided and the ore was cooled during the exothermic reaction by passing excess air at ambient temperature over the roasting ore.

The hot roast from the secondary roaster was cooled to below 100° C. by passing air thereover. It was also found that it was possible to spray droplets or a mist of water on the hot ore and thereby achieve a faster rate of cooling without adversely affecting the particle size of the roasted ore. When the ore was thus cooled, the particle size was substantially the same as that of the hot roasted ore leaving the secondary roaster.

Four vats arranged in series were filled with the cooled ore from the secondary roaster and then the ore was percolation leached with water using about one ton of water per ton of ore. The leach liquor was advanced through the four vats in series at a rate sufficient to assure contact with the ore over a 24 hour period. Also, the process was operated continuously with a fresh vat of ore being placed on stream in contact with the most concentrated leach liquor when the first vat in the series was completely leached.

Roasting and percolation leaching in accordance with this sample resulted in the solubilization of 91–92% of the original vanadium content of the ferrophosphous and the recovery of substantially all of the solubilized vanadium. It was not necessary to crush the roasted ore to a smaller particle size to achieve as complete a recovery as would have been possible with agitation leaching of crushed roasted ore.

The leach liquor contains approximately 50 g./l. of $V_2O_5$, 20 g./l. of $P_2O_5$, 0.5 g./l. of chromium, 25 g./l. of chloride ion and 50 g./l. of sodium ion. The vanadium values were recovered by precipitation with excess ammonium chloride to produce a crude ammonium metavanadate product which was purified by dissolving in a slight excess of sodium carbonate, the solution filtered, and ammonium metavanadate re-precipitated in the pure form by addition of excess ammonium chloride. The pure ammonium metavanadate was decomposed by heating to an elevated temperature to produce vanadium pentoxide, which was fused to black cake. The black cake contained more than 98% $V_2O_5$, less than 0.05% phosphorus, less than 0.02% sulfur, less than 0.5% sodium and potassium oxide, less than 0.02% arsenic, less than 0.5% silica and less than 0.5% iron. Thus, it met all specifications for the commercial product and it was not necessary to resort to a more involved upgrading.

*Example IX*

The procedure of Example VIII was followed with the exception of adding 0.03 pound of calcium oxide for each ton of ferrophosphorus prior to passing the roasted ore from the primary roast to the ball mill. Thus, the added calcium oxide was present in the ferrophosphorus at a time of the secondary roast.

The leach liquor resulting from leaching the output from the secondary roaster contained a noticeably smaller amount of phosphorus and the crude ammonium metavanadate also was of much higher purity. It was possible to purify the crude ammonium metavanadate precipitate sufficiently by digesting it in a small amount of sodium carbonate and complete solution was not necessary for purification purposes. After a short digestion period, excess ammonium chloride was added without filtration to re-precipitate the vanadium content as ammonium metavanadate. The ammonium metavanadate was recovered, decomposed by heating and fused to black cake as in Example VIII. This procedure produced a satisfactory vanadium product which met all commercial specifications without the necessity for further upgrading.

*Example X*

The procedure of Example VIII was followed except as noted below.

In the procedure of Example VIII, sufficient cooling air was supplied to the roasters to provide the desired temperature range during the exothermic portion of the roast. This resulted in a large volume of gases exiting from the primary roaster. It was difficult to adequately scrub the large volume of roaster gases free of the gaseous hydrochloric acid.

About 1.0–1.5 lbs. of water for each pound of ferrophosphorus is sprayed on the ore on the first two trays of the roaster and it results in adequate cooling when sufficient atmospheric air is supplied thereto to result in an oxidizing atmosphere. This reduced the output of gases from the roaster to a level whereby it was easy to scrub the gaseous hydrochloric acid content without any difficulty. Also, unexpectedly there is a sharp increase in the total amount of hydrochloric acid in the roaster gases. Thus, this procedure enables the preparation of additional hydrochloric acid which may be utilized for the preparation of ammonium chloride for the precipitation of ammonium metavanadate.

*Example XI*

The procedure of Example VIII was followed with the exception of substituting sodium carbonate for the sodium chloride. Thus, the ferrophosphorus was roasted with an alkaline sodium salt rather than a neutral sodium salt.

The resulting leach liquor contained a much larger amount of phosphorus than was true of any of the preceding examples. The phosphorus content was so high that it is not possible to obtain a vanadium oxide product which meets commercial specifications without extensive upgrading by involved, expensive procedures. Also, other contaminants were present in the leach liquor in large amounts and these too further contaminated the vanadium oxide product. It is thus apparent that alkaline sodium salts should not be used in roasting the ore and that neutral sodium salts such as sodium chloride should be added to the roast.

What is claimed is:

1. A process for recovering vanadium values from vanadium bearing ferrophosphorus comprising the steps of roasting under oxidizing conditions in the presence of an elemental oxygen-containing gas a mixture consisting essentially of vanadium bearing ferrophosphorus having a particle size not greater than about −80 mesh and sodium chloride having a particle size not greater than about −8 mesh at a temperature of about 600–750° C., cooling the roasted ferrophosphorus, adding an additional quantity of the sodium chloride to the roasted ferrophosphorus, reducing the particle size of the cooled roasted ferrophosphorus to provide particles having a size not greater than about −3 mesh, thereafter subjecting a mixture consisting essentially of the roasted ferrophosphorus and the sodium chloride to a second roast under oxidizing conditions in the presence of an elemental oxygen-containing gas at a temperature of about 600–800° C., cooling the roasted ferrophosphorus from the second roast, leaching the cooled ferrophosphorus from the second roast with an aqueous medium to produce an aqueous solution containing vanadium and phosphorus values, precipitating phosphorus-containing ammonium metavanadate from the aqueous solution containing vanadium and phosphorus values by addition of ammonium chloride, separating the precipitated ammonium metavanadate from the aqueous solution, at least partially dissolving the phosphorus-containing ammonium metavanadate in a substance selected from the group consisting of water and an aqueous solution of at least one material selected from the group consisting of sodium, potassium and ammonium carbonates and hydroxides to produce a solution containing dissolved vanadium values, and then precipitating the vanadium values by addition of a mineral acid selected from the group consisting of hydrochloric acid and sulfuric acid to the resulting solution.

2. A process for recovering vanadium values from vanadium bearing ferrophosphorus comprising the steps of roasting under oxidizing conditions in the presence of an elemental oxygen-containing gas a mixture consisting essentially of vanadium bearing ferrophosphorus having a particle size not greater than about −80 mesh and sodium chloride having a particle size not greater than about −8 mesh at a temperature of about 600–750° C., cooling the roasted ferrophosphorus, adding an additional quantity of the sodium chloride to the roasted ferrophosphorus, reducing the particle size of the cooled roasted ferrophosphorus to provide particles having a size not greater than about −3 mesh, thereafter subjecting a mixture consisting essentially of the roasted ferrophosphorus and the sodium chloride to a second roast under oxidizing conditions in the presence of an elemental oxygen-containing gas at a temperature of about 600–800° C., cooling the roasted ferrophosphorus from the second roast, leaching the cooled ferrophosphorus from the second roast with an aqueous medium to produce an aqueous solution containing vanadium and phosphorus values, precipitating phosphorus-containing ammonium metavanadate from the aqueous solution containing vanadium and phosphorus values by addition of ammonium chloride, separating the precipitated ammonium metavanadate from the aqueous solution, at least partially dissolving the phosphorus-containing ammonium metavanadate in a substance selected from the group consisting of water and an aqueous solution of at least one material selected from the group consisting of sodium, potassium and ammonium carbonates and hydroxides to produce a solution containing dissolved vanadium values, adding ammonium chloride to the resulting solution containing dissolved vanadium values and cooling the solution to precipitate ammonium metavanadate having a lower phosphorus content, the solution after precipitation of the ammonium metavanadate containing an excess of at least 25 grams per liter of ammonium chloride over the calculated amount required to precipitate the dissolved vanadium values as ammonium metavanadate.

3. The process of claim 2 wherein hydrochloric acid containing gas evolved during at least one of the roasts is scrubbed with an aqueous ammoniacal solution to produce ammonium chloride, and the ammonium chloride thus produced is used in precipitating the dissolved vanadium values as ammonium metavanadate.

4. The process of claim 3 wherein the mother liquor from at least one of the ammonium metavanadate precipitations is used in scrubbing the hydrochloric acid containing gas.

5. The process of claim 4 wherein at least a portion of the mother liquor from the second precipitation step is used in the first precipitation step as a source of ammonium chloride.

6. A process for recovering vanadium values from vanadium bearing ferrophosphorous comprising the steps of roasting under oxidizing conditions in the presence of an elemental oxygen-containing gas a mixture consisting essentially of vanadium bearing ferrophosphorous having a particle size between about −80 mesh and −400 mesh and sodium chloride having a particle size not greater than about −8 mesh at a temperature of about 600–750° C., the sodium chloride being present in an amount up to about 0.6 pound for each pound of ferrophosphorous, the ferrophosphorous being roasted until when a portion is crushed and leached with water the resulting leach liquor has a pH value of at least 5.5, cooling the roasted ore to a temperature not greater than about 500° C. by contacting it with a cooling medium selected from the group consisting of air, steam and sprayed water, adding up to about 0.3 pound of the sodium chloride for each pound of ferrophosphorous to the roasted ferrophosphorous, reducing the particle size of the cooled roasted ferrophosphorous to provide particles having a size not greater than about 3 mesh, thereafter subjecting a mixture consisting essentially of the roasted ferrophosphorous and the sodium chloride to a second roast under oxidizing conditions in the presence of an elemental oxygen-containing gas at a temperature of about 600–800° C., the ferrophosphorous being roasted in the second roast until when a portion is crushed and leached with water the resulting leach liquor has a pH value greater than 7.0, cooling the roasted ferrophosphorous from the second roast to a temperature not greater than about 500° C. by contacting it with a cooling medium selected from the group consisting of air, steam and sprayed water, the ferrophosphorous containing an added material during at least one of the roasts providing a substance selected from the group consisting of (a) up to about 0.1 pound of magnesium oxide per ton of ferrophosphorous and (b) up to about 0.04 pound of calcium oxide per ton of ferrophosphorous, the ferrophosphorous being cooled during at least a portion of a roast by addition of water, leaching the cooled ferrophosphorous from the second roast with an aqueous medium to produce an aqueous solution containing vanadium and phosphorous values, precipitating phosphorous-containing ammonium metavanadate from the aqueous solution containing vanadium and phosphorous values by addition of ammonium chloride, separating the precipitated ammonium metavanadate from the aqueous solution, at least partially dissolving the phosphorous-containing ammonium metavanadate in a substance selected from the group consisting of water and an aqueous solution of at least one material selected from the group consisting of sodium, potassium and ammonium carbonates and hydroxides to produce a solution containing dissolved vanadium values, adding ammonium chloride to the resulting solution containing dissolved vanadium values while at elevated temperature, cooling the solution to precipitate ammonium metavanadate having a lower phosphorous content, the solution after precipitation of the ammonium metavanadate containing an excess of at least 25 grams per liter of ammonium chloride over the calculated amount required to precipitate the dissolved vanadium values as ammonium metavanadate, separating the ammonium metavanadate having a lower phosphorous content from the solution and then decomposing the separated ammonium metavanadate by heating to an elevated temperature to produce vanadium oxide and gaseous ammonia.

7. The process of claim 6 wherein hydrochloric acid containing gas evolved during at least one of the roasts is scrubbed with an aqueous ammoniacal solution to produce ammonium chloride, and the ammonium chloride thus produced is used in precipitating the dissolved vanadium values as ammonium metavanadate.

8. The process of claim 7 wherein the mother liquor from at least one of the ammonium metavanadate precipitations is used in scrubbing the hydrochloric acid containing gas.

9. The process of claim 8 wherein at least a portion of the mother liquor from the second precipitation step is used in the first precipitation step as a source of ammonium chloride.

10. The process of claim 9 wherein the gaseous ammonia produced upon decomposition of the ammonium metavanadate is dissolved in an aqueous medium and used in scrubbing the hydrochloric acid containing gas.

11. The process of claim 10 wherein a substance selected from the group consisting of calcium oxide and magnesium oxide is added to at least a portion of the mother liquor from the first precipitation step whereby gaseous ammonia is evolved therefrom, and the gaseous ammonia is dissolved in an aqueous medium and used in scrubbing the hydrochloric acid containing gas.

References Cited

UNITED STATES PATENTS

| | | | |
|---|---|---|---|
| 2,357,466 | 9/1944 | Frick | 23—19.1 |
| 3,087,786 | 4/1963 | Schoder | 23—140 |
| 3,206,277 | 9/1965 | Burwell et al. | 23—18 |
| 3,227,515 | 1/1966 | Reusser | 23—18 X |
| 3,259,455 | 7/1966 | Koerner et al. | 23—18 X |

OSCAR R. VERTIZ, *Primary Examiner.*

H. T. CARTER, *Assistant Examiner.*